(12) United States Patent
Rehage et al.

(10) Patent No.: US 10,667,608 B2
(45) Date of Patent: Jun. 2, 2020

(54) PULL-OUT GUIDE AND DOMESTIC APPLIANCE

(71) Applicant: PAUL HETTICH GMBH & CO. KG, Kirchlengern (DE)

(72) Inventors: Daniel Rehage, Chemnitz (DE); Michael Lehmkuhl, Georgsmarienhutte (DE); Andreas Löh, Buckeburg (DE)

(73) Assignee: PAUL HETTICH GMBH & CO. KG, Kirchlengern (DE)

(*) Notice: Subject to any disclaimer, the term of this patent is extended or adjusted under 35 U.S.C. 154(b) by 0 days.

(21) Appl. No.: 16/086,747

(22) PCT Filed: Mar. 7, 2017

(86) PCT No.: PCT/EP2017/055252
§ 371 (c)(1),
(2) Date: Sep. 20, 2018

(87) PCT Pub. No.: WO2017/162426
PCT Pub. Date: Sep. 28, 2017

(65) Prior Publication Data
US 2019/0090636 A1      Mar. 28, 2019

(30) Foreign Application Priority Data
Mar. 21, 2016   (DE) .................. 10 2016 105 231

(51) Int. Cl.
*A47B 88/40*   (2017.01)
*A47B 88/473*  (2017.01)
(Continued)

(52) U.S. Cl.
CPC ............ *A47B 88/473* (2017.01); *A47B 88/49* (2017.01); *A47L 15/507* (2013.01); *E05F 3/00* (2013.01);
(Continued)

(58) Field of Classification Search
CPC ....... A47B 88/40; A47B 88/49; A47B 88/473; A47L 15/507; F24C 15/16; F24C 15/168; F16C 29/02; E05F 3/00; E05F 5/003
(Continued)

(56) References Cited

U.S. PATENT DOCUMENTS

| | | | |
|---|---|---|---|
| 9,004,622 B2 | 4/2015 | Garcia et al. | |
| 2014/0210329 A1* | 7/2014 | Brunnmayr | E05B 65/46 312/333 |
| 2015/0098667 A1* | 4/2015 | Brunnmayr | A47B 88/40 384/21 |

FOREIGN PATENT DOCUMENTS

| | | |
|---|---|---|
| DE | 202009004771 U | 9/2010 |
| DE | 102011054441 | 4/2013 |

(Continued)

OTHER PUBLICATIONS

Search Report issued in Int'l App. No. PCT/EP2017/055252 (dated 2017).

*Primary Examiner* — James O Hansen
(74) *Attorney, Agent, or Firm* — Barnes & Thornburg LLP

(57) ABSTRACT

The invention relates to a pull-out guide, in particular for a domestic appliance or a piece of furniture, comprising a stationary guide rail and a running rail which is movably mounted on the guide rail. A damping device comprising a fluid damper which acts on one side is provided on the guide rail, said fluid damper having a damper housing and a piston rod which can be pushed into and drawn out of the damper housing. A first activator acts on the damping device shortly before reaching a closed position during a closing movement of the running rail in order to brake the movement of the running rail. A second activator acts on the damping device shortly before reaching the maximum open position during an opening movement of the running rail in order to brake (Continued)

the movement of the running rail. The pull-out guide is preferably used in a domestic appliance, in particular in a dishwasher.

16 Claims, 10 Drawing Sheets

(51) Int. Cl.
    *A47L 15/50*     (2006.01)
    *F24C 15/16*     (2006.01)
    *A47B 88/49*     (2017.01)
    *E05F 3/00*     (2006.01)
    *E05F 5/00*     (2017.01)
    *F16C 29/02*     (2006.01)

(52) U.S. Cl.
CPC .............. *E05F 5/003* (2013.01); *F16C 29/02* (2013.01); *F24C 15/16* (2013.01); *F24C 15/168* (2013.01); *E05Y 2201/21* (2013.01); *E05Y 2900/20* (2013.01); *E05Y 2900/304* (2013.01); *E05Y 2900/306* (2013.01); *E05Y 2900/308* (2013.01); *E05Y 2900/31* (2013.01)

(58) Field of Classification Search
USPC .... 312/330.1, 333, 228.1, 311, 334.1, 334.7, 312/334.8
See application file for complete search history.

(56) References Cited

FOREIGN PATENT DOCUMENTS

| | | |
|---|---|---|
| DE | 102012111551 | 5/2013 |
| DE | 102013101358 | 8/2014 |
| DE | 102013222576 | 5/2015 |
| DE | 102013114309 | 6/2015 |
| EP | 2422682 | 2/2012 |

* cited by examiner

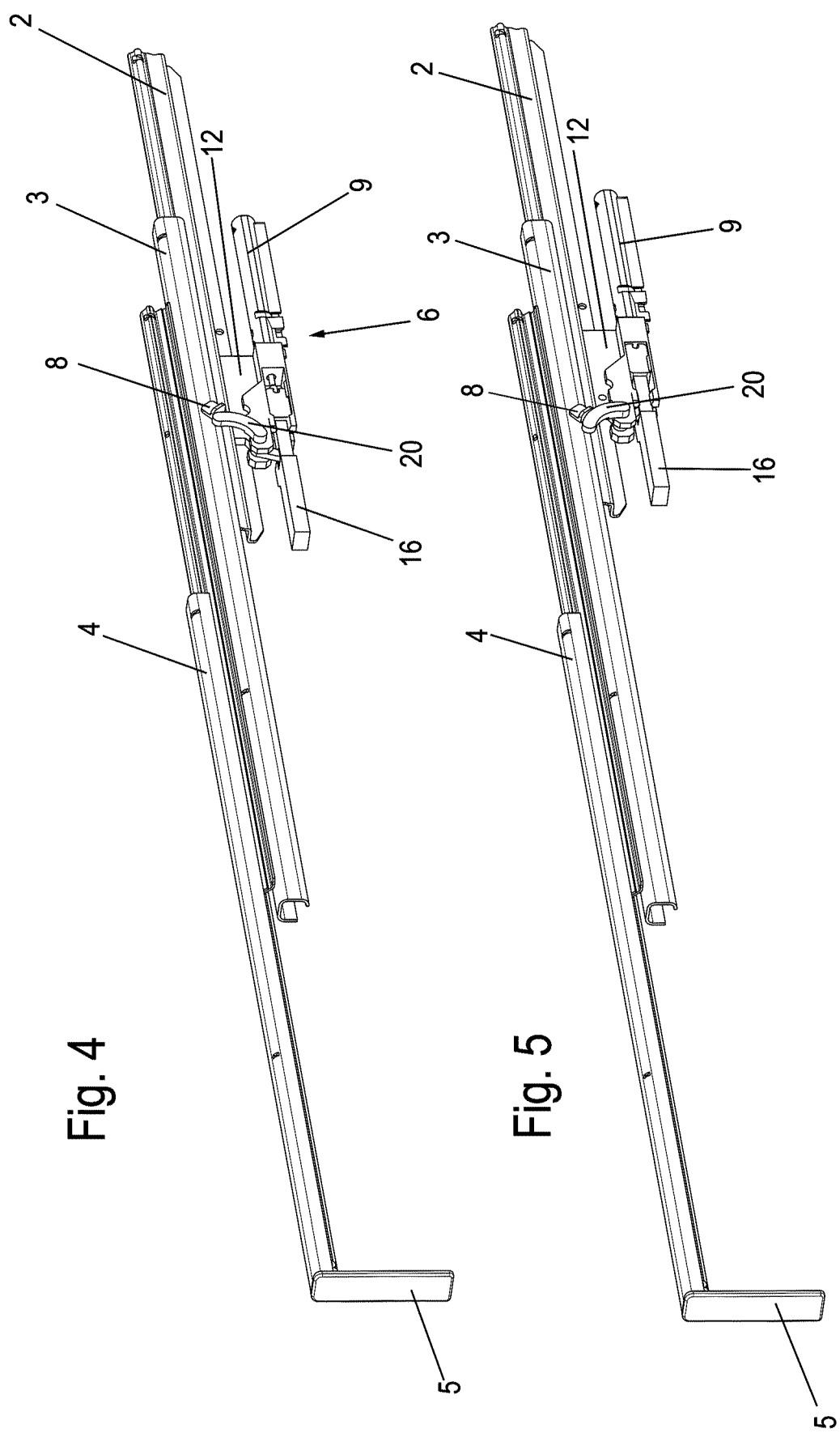

PULL-OUT GUIDE AND DOMESTIC APPLIANCE

CROSS-REFERENCE TO RELATED APPLICATIONS

This application is a U.S. nationalization under 35 U.S.C. § 371 of International Application No. PCT/EP2017/055252, filed Mar. 7, 2017, which claims priority to German Patent Application No. 102016105231.0, filed Mar. 21, 2016. The disclosures set forth in the referenced applications are incorporated herein by reference in their entireties.

BACKGROUND AND SUMMARY OF THE DISCLOSURE

The present disclosure is directed to a pullout guide, for example, for a dishwasher, another domestic appliance, or a piece of furniture, having a stationary guide rail and a slide rail supported on the guide rail so it is movable, wherein a damping device having a linear damper which acts on one side is provided on the guide rail, which has a damper housing and a piston rod, which can be pushed into and drawn out of the damper housing, wherein during a closing movement of the slide rail, a first activator acts on the damping device shortly before reaching a closed position to decelerate the movement of the slide rail, and a dishwasher or another domestic appliance having a rail-guided drawer element.

EP 2 422 682 B1 discloses a dishwasher having a damping device for damping a movement of a dish rack, wherein the damping device has a cylindrical housing and a piston, which divides the housing. The piston can be moved in this case during the pulling out via a first plate in a first direction and can be moved via a second plate in a direction opposite to the first direction during the pushing in of the dish rack, in order to provide damping forces. The damper housing is formed open on opposing sides, and therefore the sealing of the damper housing is problematic, in particular if larger damping forces are to be provided by pressure differences. Moreover, the damper is only active when the dish rack has been moved into the maximally open position, in order to displace the piston rod in relation to the housing.

Furthermore, D E 2013 114 309 A1 discloses a retraction and damping unit, which is installable on a middle rail of a pullout guide. A first activator is provided on the slide rail and a second activator is provided on the stationary guide rail for damping in the maximally open position and in the closed position. A comparatively large installation space is required due to the movement of the pullout and damping unit together with the middle rail.

Furthermore, DE 10 2013 222 576 A1 discloses a pullout guide for a domestic appliance, in which a retraction assembly is provided, via which a wash item receptacle is movable into a closed position. The retraction device has a spring element and a damping element in this case, in order to decelerate the wash item receptacle and hold it in the closed position. Damping in the opening direction is not provided, and therefore an abrupt standstill with impact noises on the dishes occurs during an opening movement of the wash item receptacle.

The present disclosure is directed to a pullout guide, for example, for a dishwasher, which is constructed compactly and ensures deceleration of the slide rail before reaching an end position both in the closing direction and also in the opening direction.

A pullout guide according to the present disclosure has a linear damper which acts on one side, which is fixed on the guide rail, i.e., is arranged so it is stationary. The damping device can become active via a first activator during a closing movement of the slide rail shortly before reaching a closed position, while during an opening movement of the slide rail, a second activator acts on the damping device shortly before reaching the maximally open position in order to decelerate the movement of the slide rail. The damping device can thus become active both in the opening direction and also in the closing direction using the linear damper which acts on one side.

A redirection mechanism may be provided to cause a movement of the second activator in the opening direction into the movement of a stop acting on the linear damper in the closing direction. The terms "opening direction" and "closing direction" relate in this case to the movement of the slide rail of the pullout guide which is moved from the respective end positions in the opening or closing directions. Since the linear damper acts on one side, a movement of the second activator in the opposing direction can be effectuated via the redirection mechanism. For this purpose, a rotatably supported redirection lever is preferably provided. The rotatably supported redirection lever can have in this case a first arm, which can be engaged with the second activator, and a second arm arranged on the opposite side of the axis of rotation, which acts directly or indirectly on the linear damper via a stop. To be able to move the redirection lever back into a starting position after an actuation of the linear damper, it can be coupled to the stop. For example, the redirection lever can engage with the second arm in a receptacle of a linearly guided stop, which acts on the linear damper, and therefore the redirection lever is pivoted in the one direction or the opposing other direction during a movement of the stop.

In a further embodiment, the linear damper is designed as a compression damper, in which damping forces are only generated as the piston rod is pushed into the damper housing. Alternatively, the linear damper can also be designed as a traction damper, in which damping forces are only generated as the piston rod is pulled out of the damper housing. In the case of a linear damper which acts on one side, a damping force is provided in a first movement direction of the piston rod, while smooth movement of the piston rod in relation to the damper housing is possible in the opposing movement direction. If the linear damper is designed as a compression damper in this case, the damper housing can be made cup-shaped, i.e., it can be closed on the side opposite to the piston rod, and therefore no problems occur upon sealing, even if high pressures are present in the region of the cup-shaped housing as the piston rod is pushed in. Only the region around the piston then has to be sealed, which is possible more easily because of the protected arrangement of the piston inside the damper housing.

The damping device may have a spring, in order to draw or press the piston rod out of the damper housing in the unloaded state. The spring can be arranged both in the damper housing and also outside the damper housing in this case, in order to move the linear damper into a starting position in the unloaded state.

The linear damper can be designed, for example, as a fluid, air, or gas damper in this case, in which the respective medium flows through constricted overflow channels during movement of the piston rod in the damping direction and exerts a damping or decelerating effect at the same time, and wherein during the movement of the piston rod opposite to the damping direction, the overflow channels are widened and thus a damping or decelerating effect does not occur or is reduced.

In a further embodiment, the first activator is fixed on the slide rail. This activator then ensures the damping in the closing direction. A second activator may be arranged on a middle rail, which is provided between the guide rail and the slide rail of the pullout guide. The second activator is then active in the opening direction, shortly before the slide rail has reached the maximally open position.

The damping device may be fixed via a housing on the guide rail, for example, a housing made of plastic, on which the damper housing is locked. Vice versa, of course, the piston rod can also be fixed via the housing on the guide rail, and therefore the first or second activator acts on the damper housing and causes its movement in relation to the guide rail.

In a further embodiment, a self-retractor is provided, by means of which the slide rail is movable in the closing direction shortly before reaching the closed position. The self-retractor can have a driver movable along a housing in this case, which is pre-tensioned by a force accumulator in the closing direction. The self-retractor may be active only in the movement range shortly before the closing position in this case, but not before reaching the maximally open position. To ensure that the self-retractor is only active in the region of the closed position, the driver of the self-retractor can act on a movable stop, by means of which the linear damper is actuable. This stop can also be actuated in this case by the second activator in the opening direction, while the driver of the self-retractor remains functionless during a movement of the slide rail in the opening direction.

The pullout guide according to the present disclosure may be used in a domestic appliance, for example, in a dishwasher, in particular if two pullout guides are fixed on opposing sides of an interior. Drawer elements, which can be designed as dish racks in dishwashers, can then be movably supported via the pullout guide. A use in furniture or other domestic appliances having rail-guided food supports or containers is also possible.

It is also possible not to attach the pullout guides directly on the side walls of a dishwasher or furniture body, but rather on variable-position lever mechanisms, which are in turn linked on the side walls. Such a lever mechanism is disclosed, for example, in DE 202009004771 U1. In this manner, the functionality of this invention may also be transferred to dish racks or movable furniture parts, which can change not only the horizontal position, but rather also the vertical position in relation to the dishwasher housing or furniture body.

BRIEF DESCRIPTION OF THE DRAWINGS

FIG. 4 shows a view of the pullout guide of FIG. 1 shortly before reaching the maximally open position;

FIG. 5 shows a view of the pullout guide of FIG. 1 in the maximally open position;

DETAILED DESCRIPTION OF THE DRAWINGS

Figure 1:
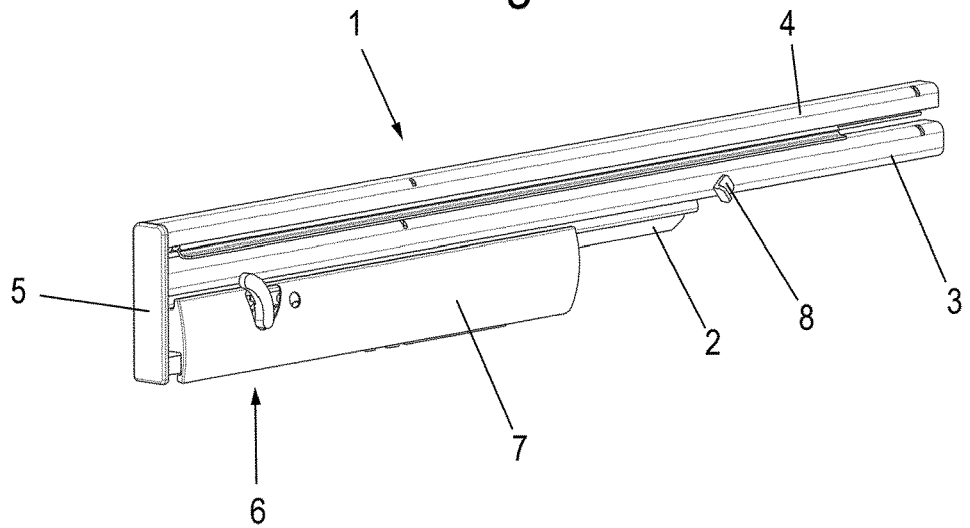
FIG. 1 shows a perspective view of a pullout guide having a damping device in a closed position.

The drawings show an illustrative pullout guide 1 comprising a stationary guide rail 2, on which a middle rail 3 is movably supported via roller bodies. A slide rail 4 is movably supported via further roller bodies on the middle rail 3. A web-shaped activator 5, which can be engaged with a damping device 6, which is arranged behind a cover 7 in FIG. 1, is fixed on an end face on the slide rail 4.

Figure 2:
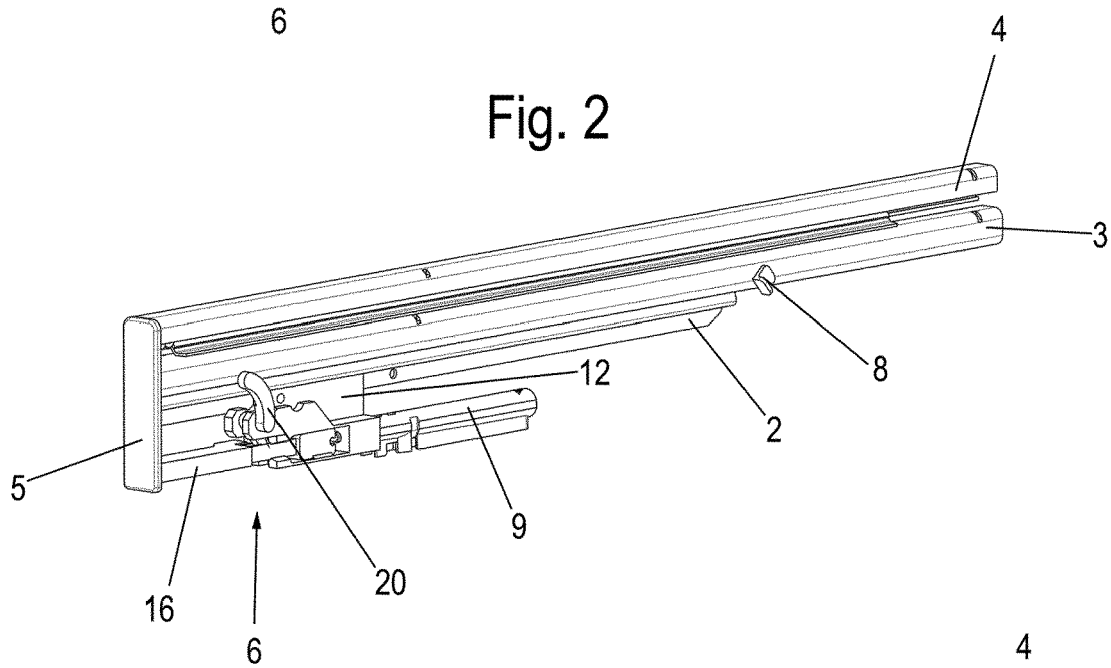
FIG. 2 shows a view of the pullout guide of FIG. 1 without cover.

In FIG. 2, the cover 7 was omitted, and it is recognizable that the damping device 6 has a housing 12, which is fixed on the stationary guide rail 2. A damper housing 9 of a linear damper, which is designed as a fluid damper, in particular as a liquid damper, is fixed on the housing 12. A cylindrical interior, in which a piston is displaceably supported, which is coupled to a piston rod 10, is formed in the damper housing 9. The damping device 6 can in this case decelerate the movement of the slide rail 4 both shortly before reaching the maximally open position and also shortly before reaching the closed position.

Figure 3:
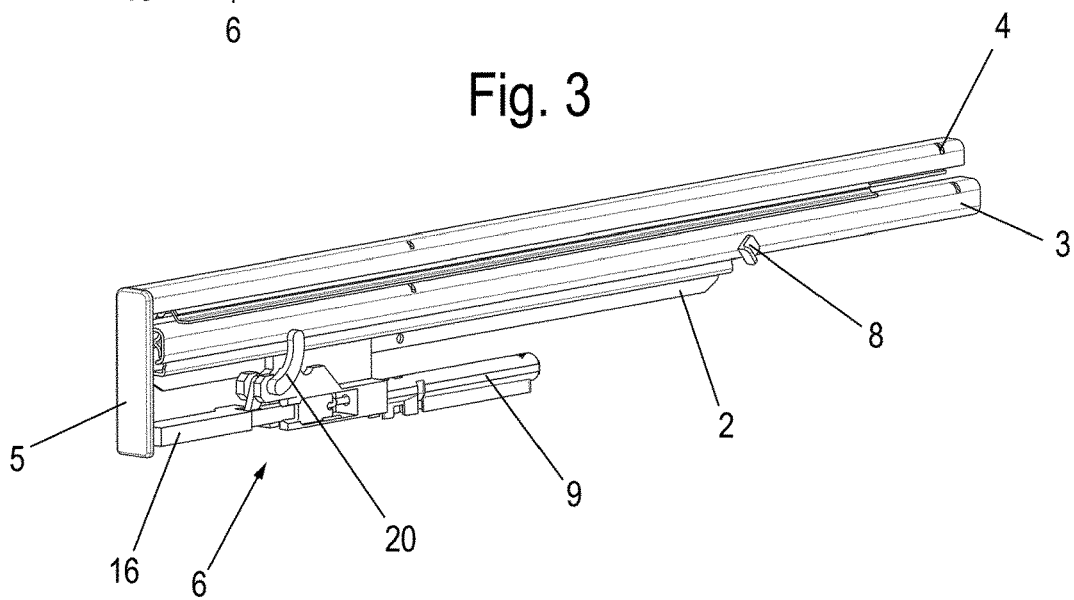
FIG. 3 shows a view of the pullout guide of FIG. 1 in a slightly open position.

In FIG. 3, the slide rail 4 was moved slightly in the opening direction and it is recognizable that the web-shaped activator 5 is now arranged spaced apart from a plunger 16 of the damping device 6.

The slide rail 4 can be moved according to FIG. 4 up to shortly before reaching the maximally open position, before the damping device 6 becomes active. A second activator 8 fixed on the middle rail 3 can be engaged shortly before reaching the maximally open position with a redirection lever 20, which acts on the damping device 6, in order to provide damping forces for decelerating the movement of the slide rail 4 in the opening direction. The second activator 8 may be formed as a portion of the middle rail 3, which protrudes out of the plane of the middle rail 3. In FIG. 5, the maximally open position of the slide rail 4 is reached, and the redirection lever 20 was pivoted counterclockwise about an axis of rotation.

Figure 6A:
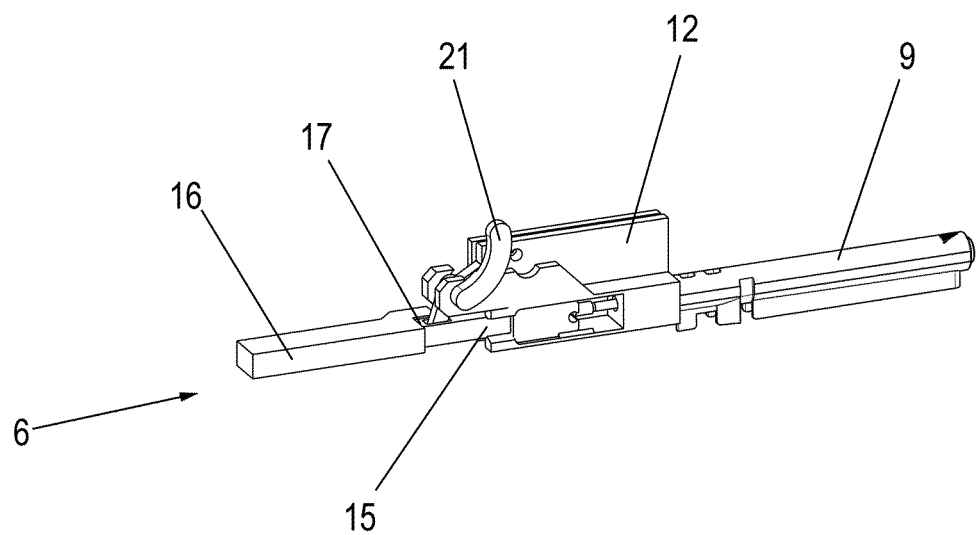
FIGS. 6A to 6C show multiple views of the damping device of the pullout guide of FIG. 1.
Figure 6B:
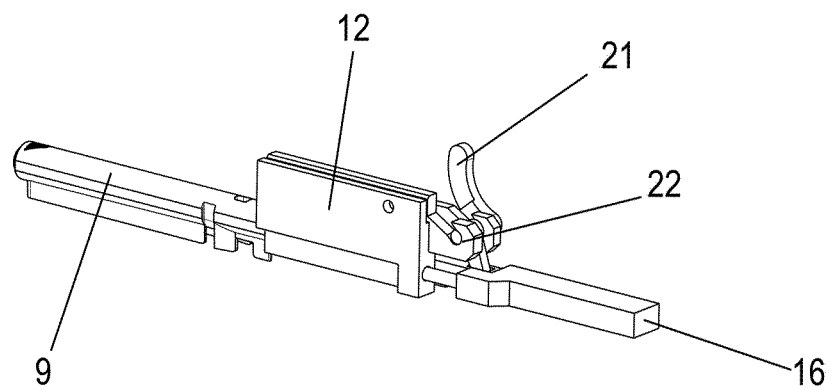
Figure 6C:
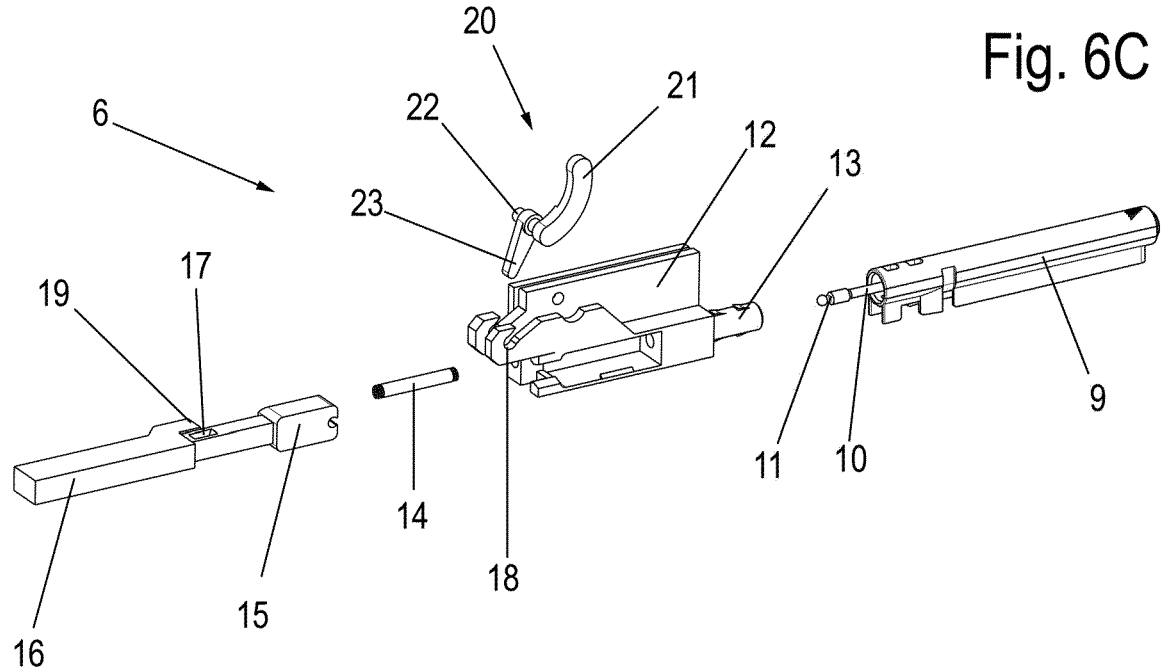

The damping device 6 is shown in detail in FIGS. 6A to 6C. Two web-shaped holders having a receptacle 18 are formed on the housing 12 in order to accommodate an axis 22 of the redirection lever 20. The redirection lever 20 comprises a first arm 21, which can be engaged with the second actuator 8 on the middle rail 3. Furthermore, the redirection lever 20 comprises a second arm 23, which acts on the linear damper, on the opposing side of the axis 22. For this purpose, the second arm 23 engages in a recess 17 on the plunger 16, which is guided linearly on the housing 12. The plunger 16 has a connecting section 15, which is connected to a connecting element 11 on the piston rod 10. The plunger 16 can therefore be moved together with the piston rod 10. The damper housing 9 is fixed, in particular interlocked, on a sleeve-shaped projection 13 of the housing 12.

In order to move the linear damper into a starting position, in which the piston rod 10 protrudes from the damper housing 9, a spring 14 is provided, which is supported on one side on the housing 12 and is supported on the opposing side on a stop 19 of the plunger 16.

To cause damping, when the slide rail 4 moves in the closing direction, the first activator 5 presses against the plunger 16, which acts via the connecting section 15 on the piston rod 10 and pushes it into the damper housing 9. The movement of the slide rail 4 in the closing direction is thus decelerated in order to avoid loud impact noises.

If the slide rail 4 is moved in the opening direction, the middle rail 3 moves at approximately half of the speed of the slide rail 4, and therefore the second activator 8 strikes against the redirection lever 20 shortly before reaching the maximally open position. The arm 21 of the redirection lever 20 is thus rotated about the axis 22, and the second arm 23 presses the plunger 16 in the closing direction again, and therefore the piston rod 10 is retracted back into the damper housing 9.

It can occur that the redirection lever 20 is in contact with the second activator 8 not only shortly before the maximally open position, but rather even before this. This takes place, for example, if the middle rail 3 and the slide rail 4 extend together until the middle rail 3 has reached its maximum extension position. In this case as well, the arm 21 of the redirection lever 20 is only rotated and the damping is activated when the slide rail 4 is also located shortly before reaching the maximal extension position.

Independently of whether the first activator 5 or the second activator 8 has caused a damping procedure, the piston rod 10 moves back out of the damper housing 9 as a result of the force of the spring 14 as soon as the slide rail 4 leaves the closed position or the maximally open position.

In the illustrative embodiment of FIGS. 1 to 6, the damping device 6 is only used for decelerating the movement of the slide rail 4 before reaching an end position. In FIGS. 7 to 12, a further illustrative embodiment of a pullout guide 1 having a damping device 6' is shown, which additionally also has a self-retractor.

The pullout guide 1 with the slide rail 4, the middle rail 3, and the stationary guide rail 2 corresponds in this case to the preceding exemplary embodiment, wherein a modified damping device 6' is fixed on the guide rail 2. In order to actuate the damping device 6', a first web-shaped activator 5' is provided on the slide rail 4, and a second activator 8 is fixed on the middle rail 3.

Figure 7A:
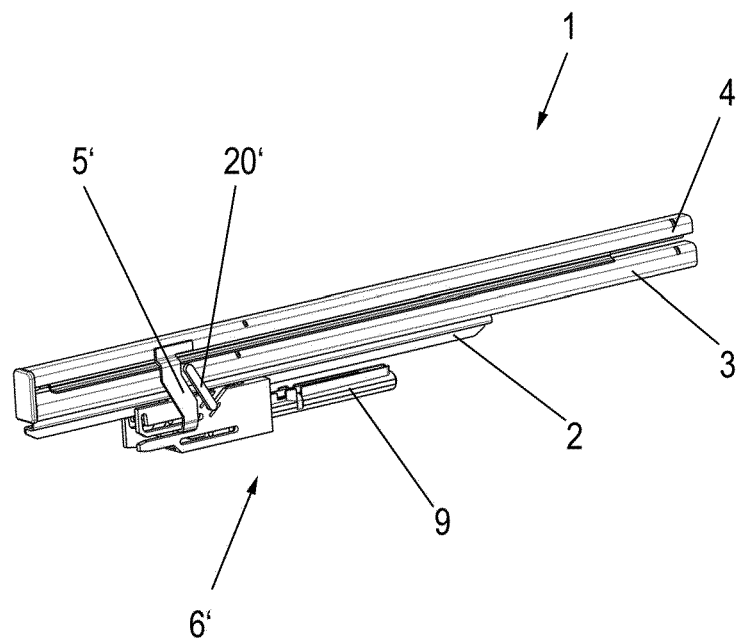
FIGS. 7A and 7B show two views of a pullout guide having a modified damping device in a closed position.
Figure 7B:
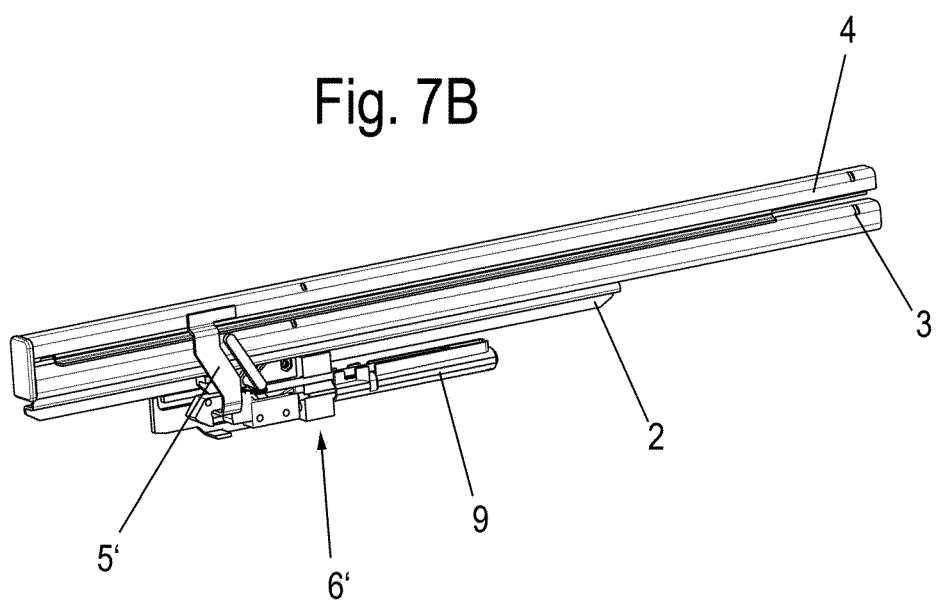

The pullout guide 1 is shown in a closed position in FIGS. 7A and 7B.

Figure 8A:
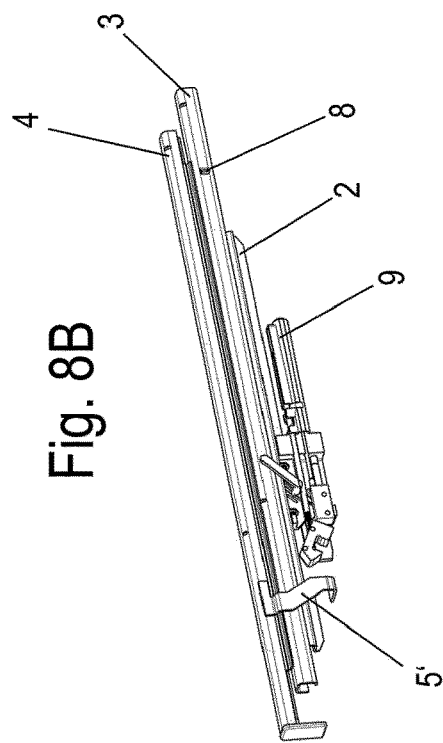
FIGS. 8A and 8B show two views of the pullout guide of FIG. 7 in a slightly open position.
Figure 8B:
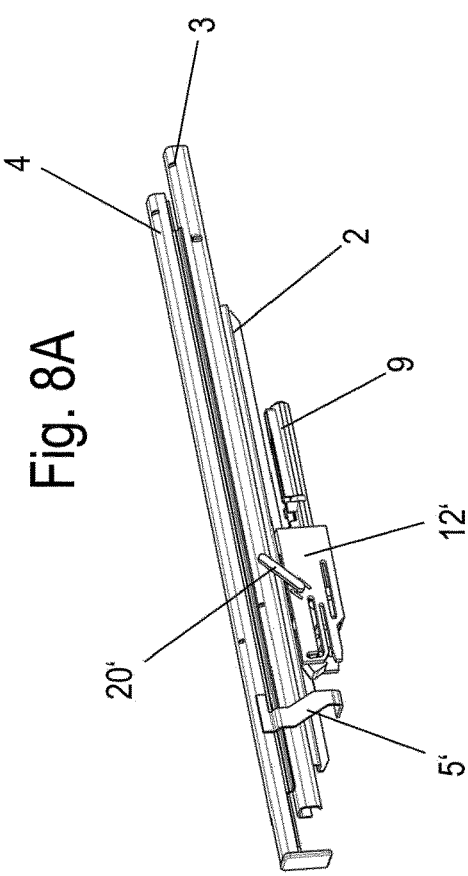
Figure 9A:
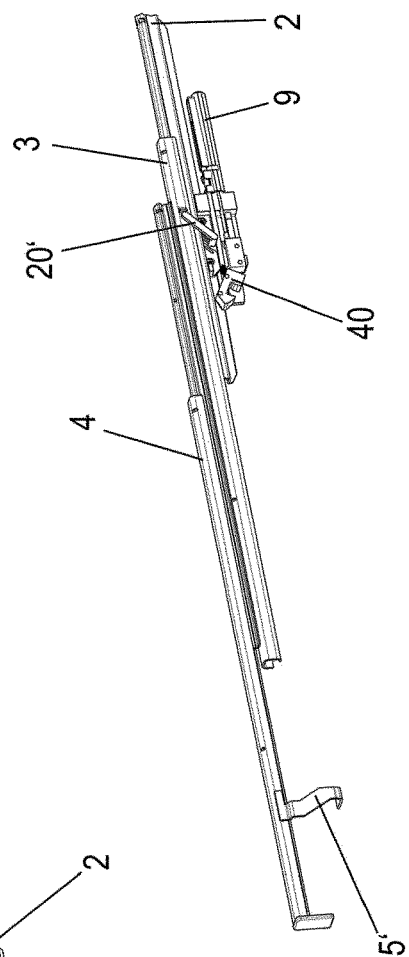
FIGS. 9A and 9B show two views of the pullout guide of FIG. 7 shortly before reaching the maximally open position.
Figure 9B:
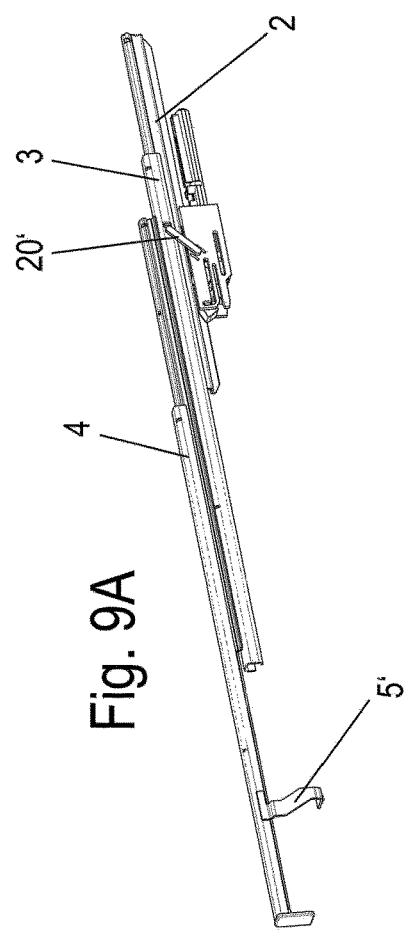
Figure 10A:
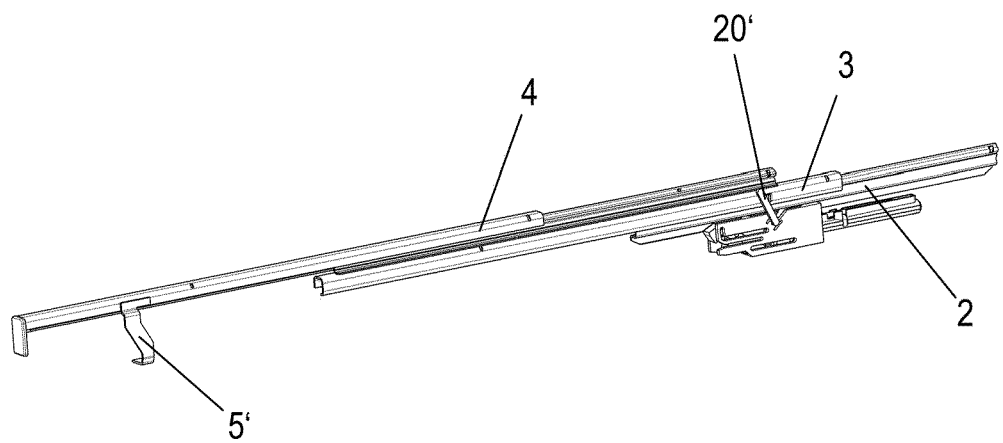
FIGS. 10 and 10B show two views of the pullout guide of FIG. 7 in the maximally open position.
Figure 10B:
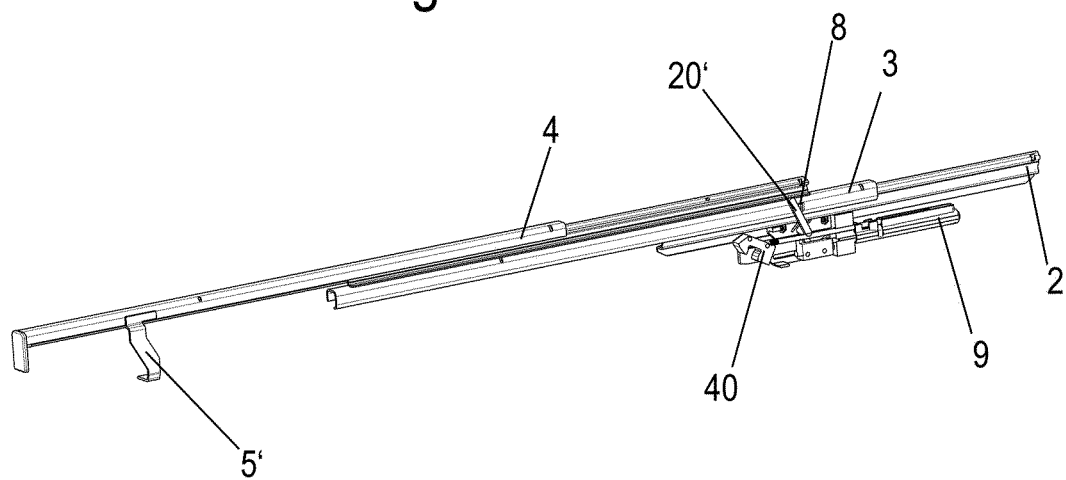

If the slide rail 4 is moved slightly in the opening direction, as shown in FIGS. 8A and 8B, a spring presses a piston rod 10 out of the damper housing 9 and thus pivots the redirection lever 20' clockwise. If the slide rail 4 is moved further in the opening direction, the second activator 8 encounters the redirection lever 20', as shown in FIGS. 9A and 9B. The movement of the slide rail 4 in the opening direction is now decelerated, since the piston rod 10 is retracted into the damper housing 9 due to rotation of the redirection lever 20', until the position shown in FIGS. 10A and 10B is reached. From this end position, the slide rail 4 can now be moved back in the closing direction, wherein the redirection lever 20' is again rotated clockwise by moving the second activator 8 in the closing direction and by the force of the spring 14, and the linear damper is ready for the deceleration of the slide rail 4, independently of whether it is moved into an end position in the opening or closing direction.

Figure 11A:
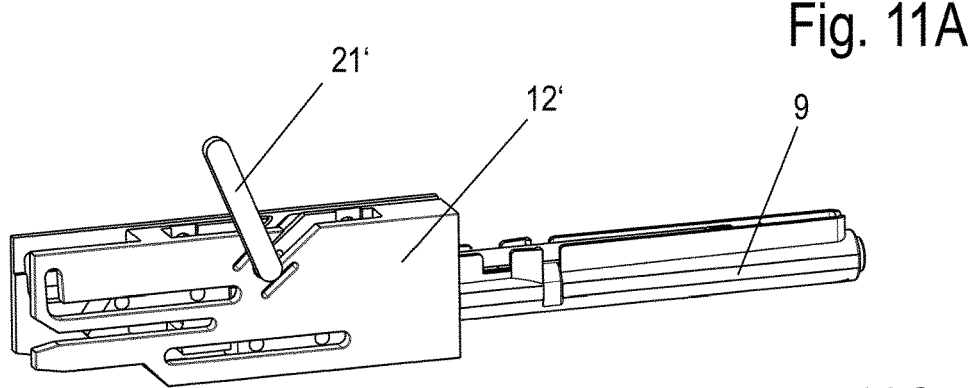
FIGS. 11A to 11C show multiple views of the damping device of the pullout guide of FIG. 7.
Figure 11C:
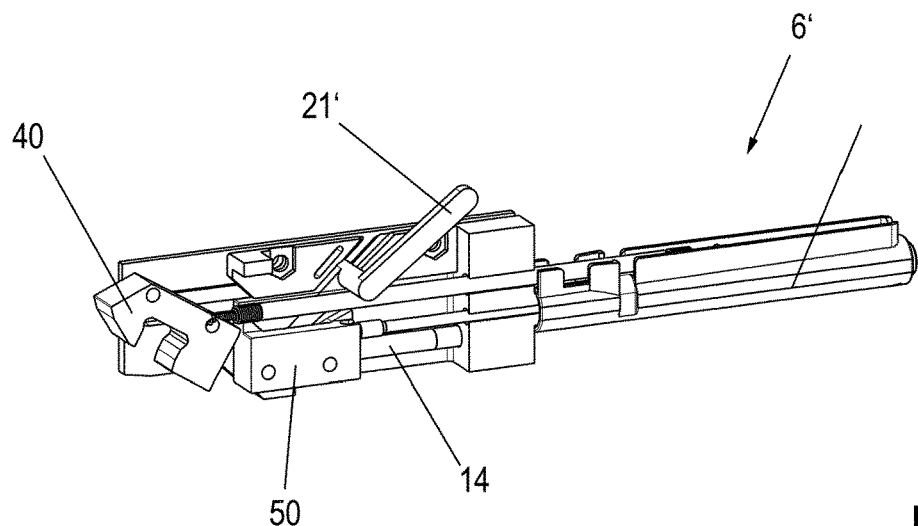
Figure 11B:
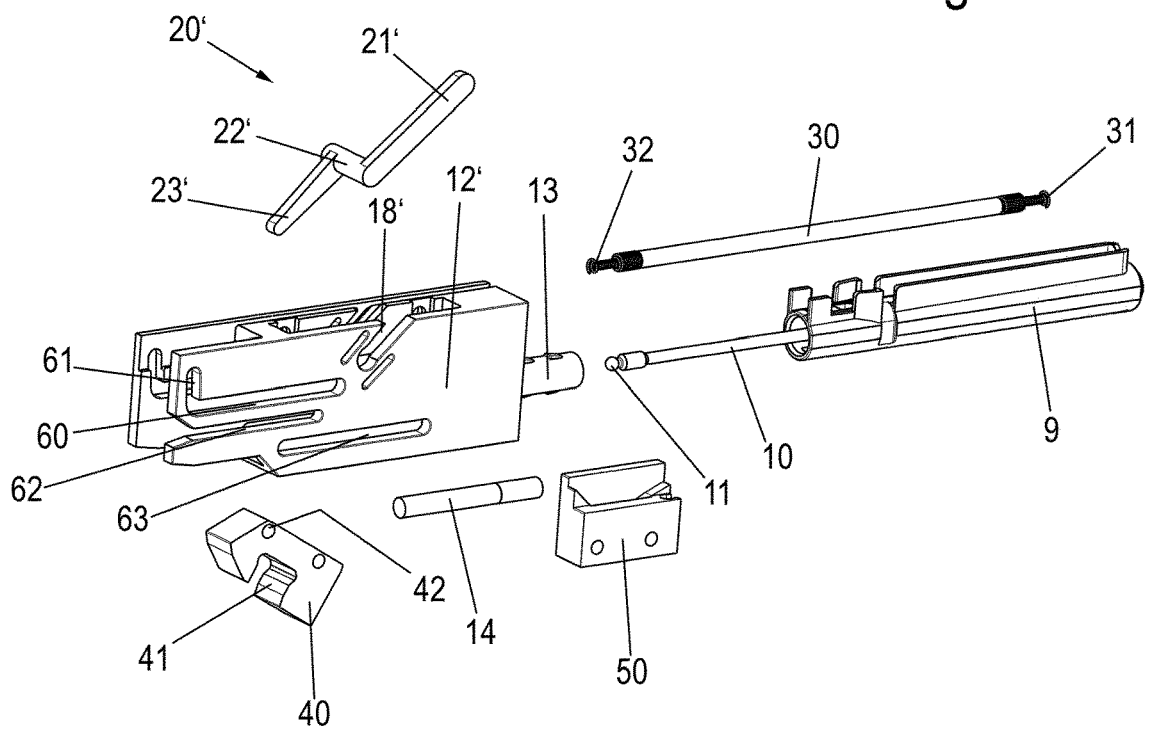

The modified damping device 6' having the self-retractor is shown in detail in FIGS. 11A to 11C. A sleeve-shaped projection 13, on which the damper housing 9 is interlocked, is provided on the housing 12'. The redirection lever 20', which has an axis 22', from which a first arm 21' and a second arm 23' extend radially, is rotatably supported on the damper housing 12' on a receptacle 18'. The first arm 21' can be engaged with the second activator 8 in this case, while the second arm 23' engages in a block-shaped stop 50, which is guided linearly in the housing 12'. The block-shaped stop 50 is coupled in this case to the connecting element 11 on the piston rod 10. In addition, a spring 14 acts on the block-shaped stop 50 in order to pre-tension the stop 50 and thus also the piston rod 10 in an extended position.

Furthermore, a driver 40 is movable on the housing 12' along a guide path 60, which has an angled end section 61. The driver 40 is guided via pin 42 in the guide path 60, wherein two side walls of the housing 12' enclose the driver 40. A receptacle 41, which can be engaged with a portion of the first activator 5', is provided on the driver 40. The activator 5' can be introduced at a slotted receptacle 62 of the housing 12' in order to be engaged with the driver 40.

The driver 40 is pre-tensioned using a spring 30 in the closing direction, wherein the spring 30 is fixed with a first end 31 on the damper housing 9 and at a second end 32 on the driver 40. Alternatively, the spring can also be fixed on another component or on the inner wall of a domestic appliance or on a body of a piece of furniture. If the driver 40 is located with a pin 42 on the angled end section 61, it is in a parked position. By retracting the activator 5' into the receptacle 41 on the driver 40, it can be disengaged or unlocked from the parked position, in order to then be moved by the force of the spring 30 along the guide path 60 in the closing direction. During the movement of the driver 40 in the closing direction, it encounters the linearly guided stop 50, which is guided in the guide path 63, and therefore the movement of the driver 40 is braked via the linear damper.

The movable stop 50 is located in this case between the driver 40 and the connecting element 11 on the piston rod 10. The movable stop 50 can thus be activated both during a closing movement of the slide rail 4 and also during an opening movement of the slide rail 4, while the driver 40 of the self-retractor is only actuated via the activator 5' during a closing movement of the slide rail 4.

Figure 12A:
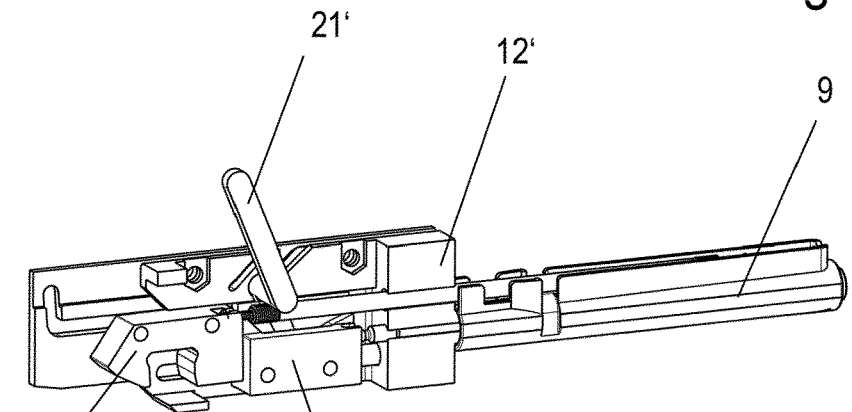
FIGS. 12A to 12C show multiple views of the damping device of FIG. 11 in different positions.

In FIG. 12A, the damping device 6' is shown when the slide rail 4 is arranged in the closed position. Both the driver 40 and also the movable stop 50 are located in the rear position 12' and have ensured that the piston rod 10 is retracted into the damper housing 9.

Figure 12B:
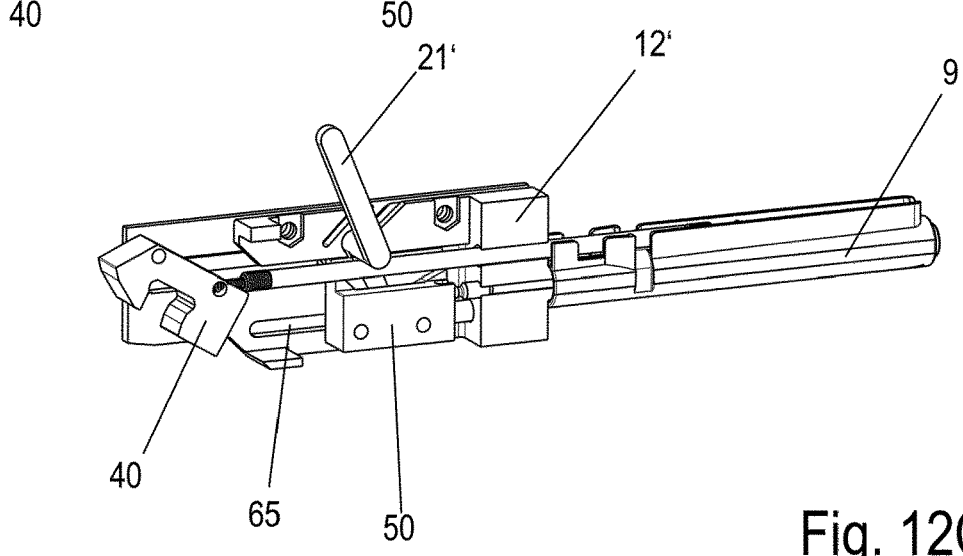

In FIG. 12B, the position is shown when the slide rail 4 is in the maximally open position. The driver 40 of the self-retractor is located in the parked position, while the movable stop 50 was moved along a guide path 63 inside the housing 12', in order to retract the piston 10 into the damper housing 9. Therefore, only the linear damper, but not the self-retractor, is active in the opening direction.

Figure 12C:
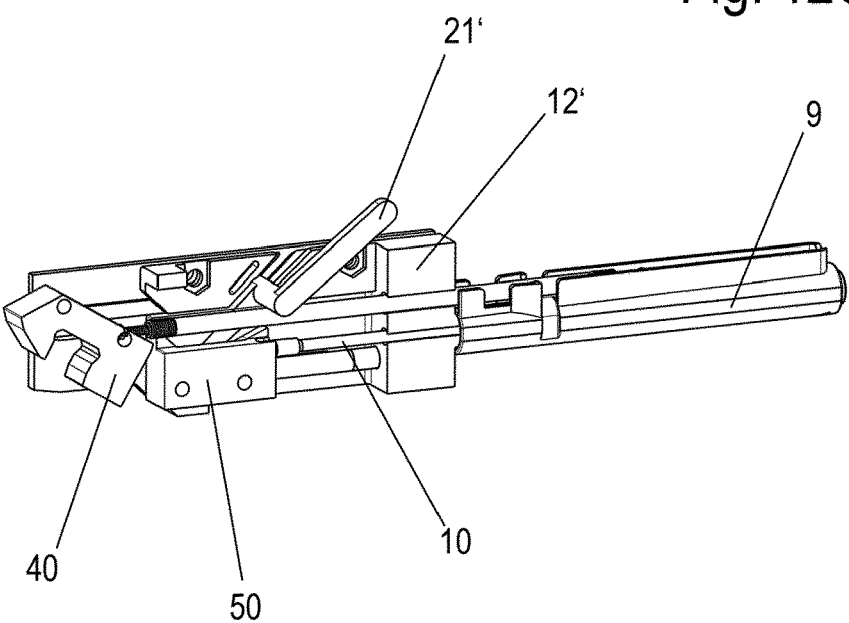
Figure 13A:
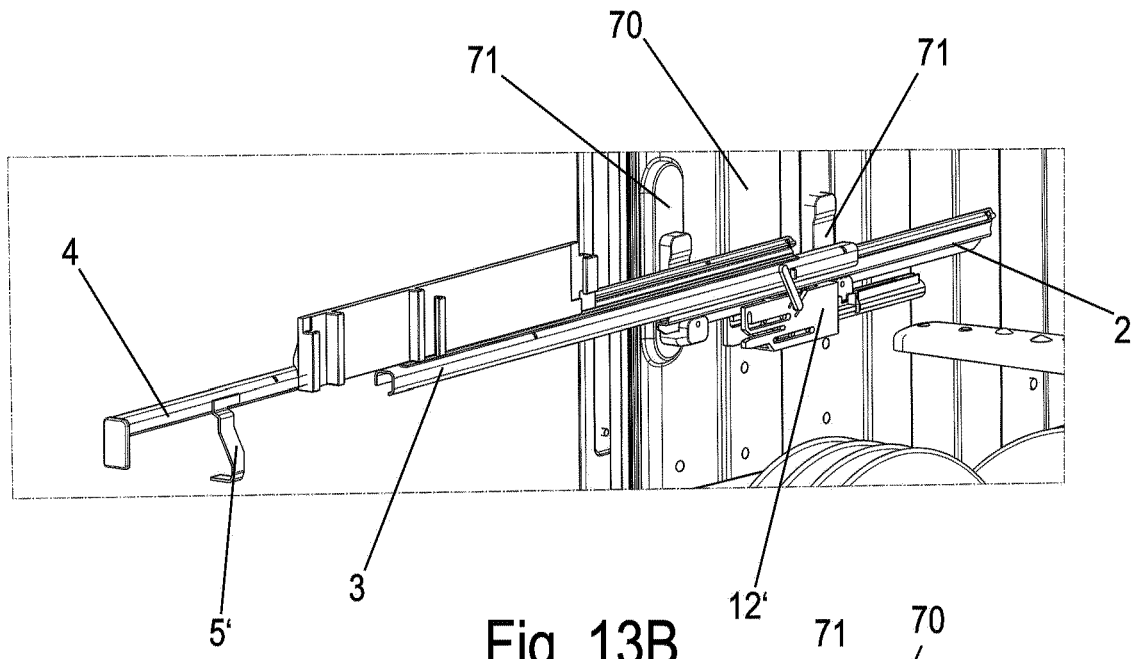
FIGS. 13A and 13B show two views of a pullout guide installed on a dishwasher in an open position.
Figure 13B:
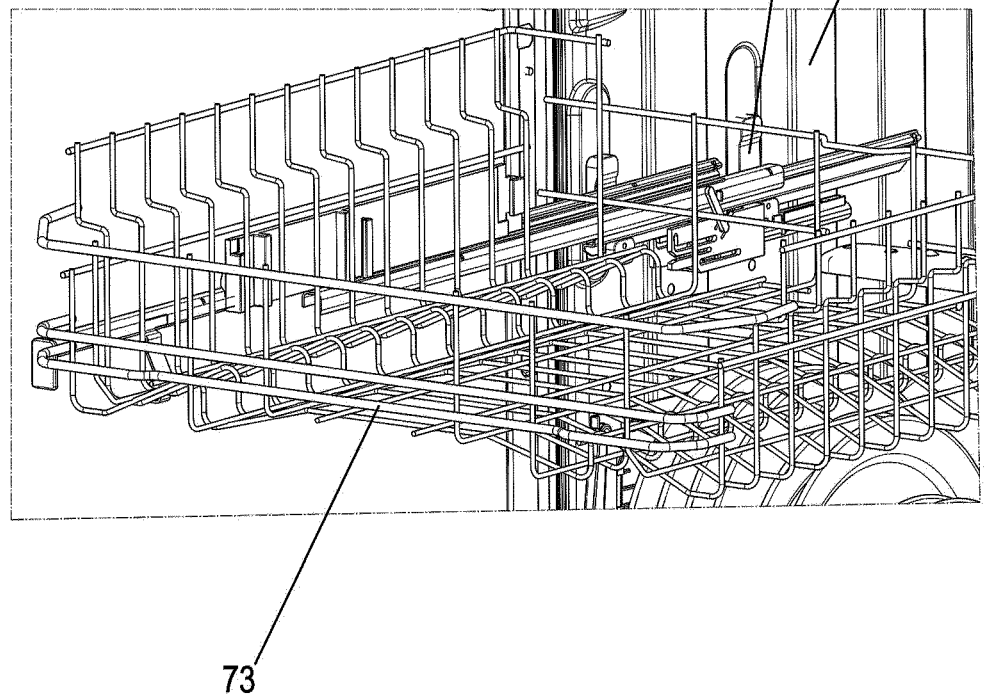

In FIG. 12C, the position of the damping device 6' is shown when the slide rail 4 is located neither in the closed position nor in the maximally open position. As a result of the force of the spring 14, the movable stop 50 is moved into a position in which the piston rod 10 is extended. The spring force of the spring 14 is significantly less than the spring force of the spring 30, so that the self-retractor can move the slide rail 4 reliably into its retracted end position.

In FIGS. 13A, 13B, 14A, and 14B, the pullout guide shown in FIGS. 7 to 11 is installed on an inner wall 70 of a dishwasher. Two holders 71, on which the guide rail 2 is fixed, for example, via catch or clamping means, are located on the inner wall 70. A drawer element, for example, a dish rack 73, which is decelerated in each case before reaching the maximally open position and before reaching the closed position, by the slide rail 4 being decelerated, is retained on the slide rail 4 of the pullout guide. A corresponding pullout guide can be provided on opposing sides of the interior of the dishwasher.

Figure 14A:
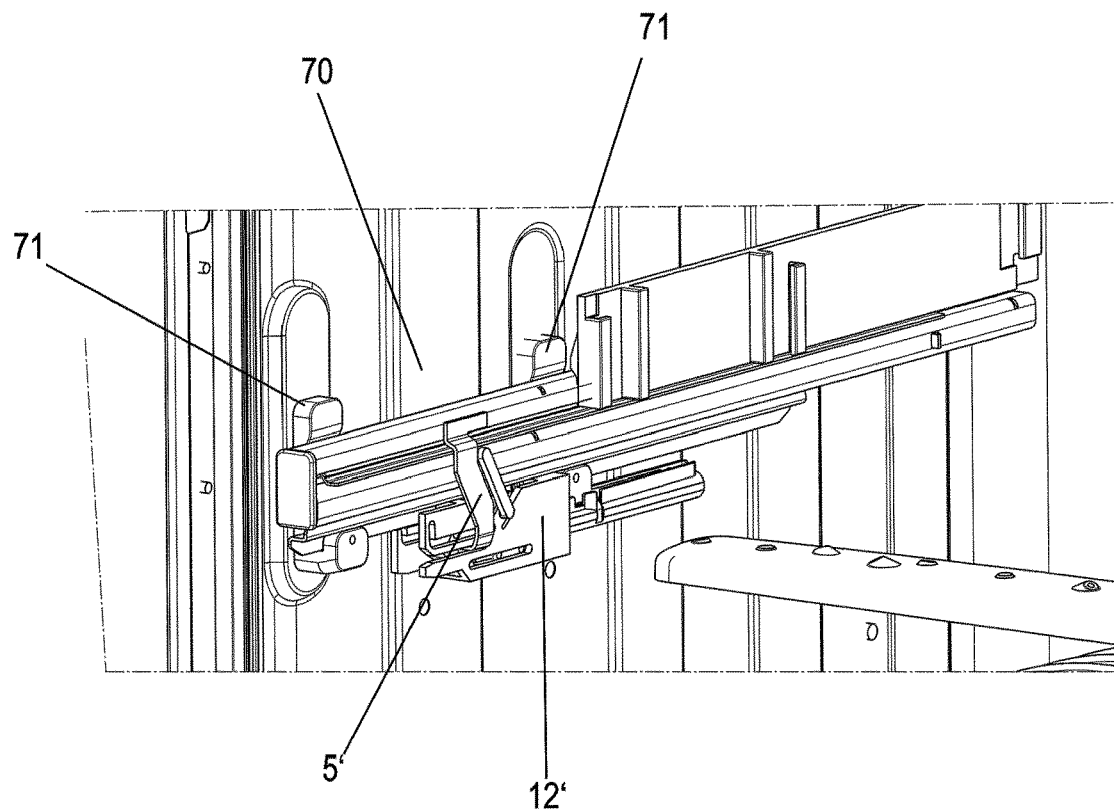
FIGS. 14A and 14B show two views of the pullout guide of FIG. 13 in the closed position.
Figure 14B:
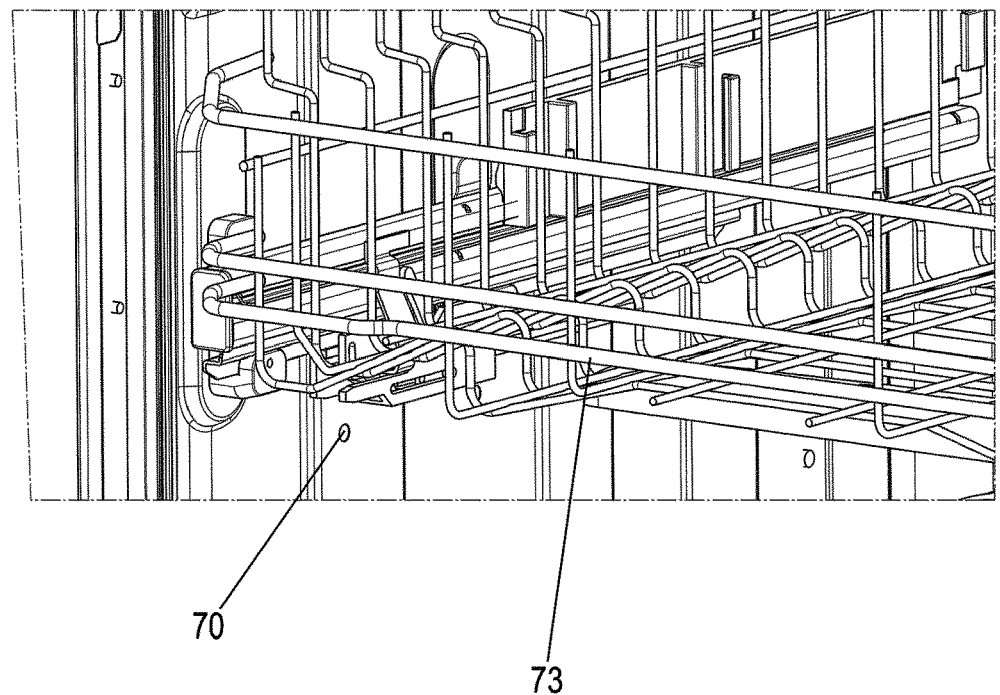

In FIG. 14A, the pullout guide 1 is shown without the dish rack 73 in the closed position in the dishwasher. In FIG. 14B, the dish rack 73 is retracted into the interior of the dishwasher, and the slide rail 4 is located in the closed position.

In an illustrative embodiment, the pullout guide 1 is installed in a dishwasher. The pullout guide according to the present disclosure can be used in pieces of furniture or in other domestic appliances, such as refrigerators, freezers, ovens, microwave ovens, or warming drawers.

The pullout guide 1 in an illustrative embodiment consists of a guide rail 2, a middle rail 3, and a slide rail 4. It is also possible to use the damping device 6 in a so-called partial pullout without middle rail, wherein in this case the second activator 8 would also be arranged on the slide rail 4.

In a further variant (not shown), the driver 40 and the stop 50 are moved in a common guide path.

In an illustrative embodiment, the redirection mechanism comprises a rotatably supported redirection lever. It is also possible to use a displaceably supported redirection element instead of a redirection lever, which is displaceable, for example, along a bent curve guide.

Instead of a compression spring, a traction spring can also be applied to the damper. The traction spring can be fixed, for example, on one side on the housing and on the other side on the movable stop, in order to be able to move the damper back into the starting position.

The invention claimed is:

1. A pullout guide having a guide rail and a slide rail movably supported on the guide rail, wherein a damping device having a damper which is active on one side is provided on the guide rail, which has a damper housing and a piston rod that can be pushed into and drawn out of the damper housing, wherein during a closing movement of the slide rail, shortly before reaching a closed position, a first activator acts on the damping device, thereby pushing the piston rod into the damper housing, in order to decelerate the movement of the slide rail, wherein, during an opening movement of the slide rail, shortly before reaching the maximally open position, a second activator acts on the damping device, thereby pushing the piston rod into the damper housing, in order to decelerate the movement of the slide rail.

2. The pullout guide according to claim 1, wherein a redirection mechanism is provided, in order to cause a movement of a stop acting on the damper in the closing direction by way of a movement of the second activator in the opening direction.

3. The pullout guide according to claim 2, wherein the redirection mechanism has a rotatably supported redirection lever.

4. The pullout guide according to claim 3, wherein the rotatably supported redirection lever has a first arm, which can be engaged with the second activator, and a second arm, which is arranged on the opposing side of an axis of rotation and acts via a stop on the damper.

5. The pullout guide according to claim 4, wherein the redirection lever engages with the second arm in a receptacle of a linearly guided stop, which acts on the damper.

6. The pullout guide according to claim 1, wherein the damper is designed as a compression damper, in which damping forces are generated as the piston rod is pushed into the damper housing.

7. The pullout guide according to claim 6, wherein the damping device has a spring, in order to draw the piston rod out of the damper housing in the unloaded state.

8. The pullout guide according to claim 1, wherein the first activator is fixed on the slide rail.

9. The pullout guide according to claim 8, wherein the second activator is arranged on a middle rail, which is provided between the guide rail and the slide rail.

10. The pullout guide according to claim 1, wherein the damping device has a housing, which is fixed on the guide rail.

11. The pullout guide according to claim 1, further comprising a self-retractor configured to move the slide rail in the closing direction shortly before reaching the closed position.

12. The pullout guide according to claim 11, wherein the self-retractor has a driver movable along a housing, which is pre-tensioned by a force accumulator in the closing direction.

13. The pullout guide according to claim 12, wherein the driver acts on a movable stop configured to actuate the damper.

14. A domestic appliance having at least one pullout guide according claim 1.

15. The domestic appliance according to claim 14, wherein the domestic appliance is a dishwasher.

16. The domestic appliance according to claim 14, wherein the pullout guide is indirectly or directly fixed on an inner wall of the domestic appliance and a drawer element is movably supported by means of the pullout guide.

* * * * *